US011624969B2

(12) United States Patent
Gibbens et al.

(10) Patent No.: US 11,624,969 B2
(45) Date of Patent: Apr. 11, 2023

(54) ATTACHMENT SYSTEM FOR COUPLING A MOBILE COMPUTING DEVICE TO OPTICS

(71) Applicants: Kevin W. Gibbens, Mesa, AZ (US); David W. Gibbens, Mesa, AZ (US); Eric Christensen, St. Goerge, UT (US)

(72) Inventors: Kevin W. Gibbens, Mesa, AZ (US); David W. Gibbens, Mesa, AZ (US); Eric Christensen, St. Goerge, UT (US)

( * ) Notice: Subject to any disclaimer, the term of this patent is extended or adjusted under 35 U.S.C. 154(b) by 0 days.

(21) Appl. No.: 17/573,149

(22) Filed: Jan. 11, 2022

(65) Prior Publication Data
US 2022/0397806 A1  Dec. 15, 2022

Related U.S. Application Data

(60) Provisional application No. 63/209,815, filed on Jun. 11, 2021.

(51) Int. Cl.
*G02B 7/02* (2021.01)
*G02B 7/00* (2021.01)
*G03B 17/14* (2021.01)
*H04N 23/55* (2023.01)

(52) U.S. Cl.
CPC ............ *G03B 17/14* (2013.01); *H04N 23/55* (2023.01)

(58) Field of Classification Search
CPC ........ H04N 5/2254; G03B 17/14; G02B 7/04; G02B 7/02; G02B 7/021; G02B 7/10
USPC ....... 359/827, 823, 828, 819, 818, 811, 704; 348/360; 396/529–531, 533
See application file for complete search history.

(56) References Cited

U.S. PATENT DOCUMENTS

| | | | | |
|---|---|---|---|---|
| 9,223,107 B2* | 12/2015 | Sano | ...................... | G02B 7/021 |
| 2009/0143099 A1* | 6/2009 | Kang | ................. | H04N 5/23209 455/556.1 |
| 2020/0169651 A1* | 5/2020 | Hung | ..................... | G01D 5/142 |

FOREIGN PATENT DOCUMENTS

| | | | |
|---|---|---|---|
| JP | 2013029558 A | * | 2/2013 |
| JP | 2013029558 A | | 2/2013 |

OTHER PUBLICATIONS

"Phone Skope" The Skoped Industries Company, 2017, https://www.phoneskope.com/.
International Search Report and Written Opinion in PCT/US2022/032467, dated Jul. 14, 2022.

* cited by examiner

*Primary Examiner* — Dawayne Pinkney
(74) *Attorney, Agent, or Firm* — Schmeiser, Olsen & Watts LLP

(57) ABSTRACT

Provided is an attachment system for coupling a mobile computing device to an optic device. The optic device may be, but is not limited to, a scope, binoculars or the like. The attachment system operates with attachment devices and mounting device with apertures that provide a means to couple a mobile computing device to the optic device in such a way that the attachment system provides a line-of-sight between a camera of the mobile computing device with the lens of the optic device. This allows the camera of the mobile computing device to capture images and video using the high power zoom functionality of the optic device and the convenience of the mobile computing device.

19 Claims, 16 Drawing Sheets

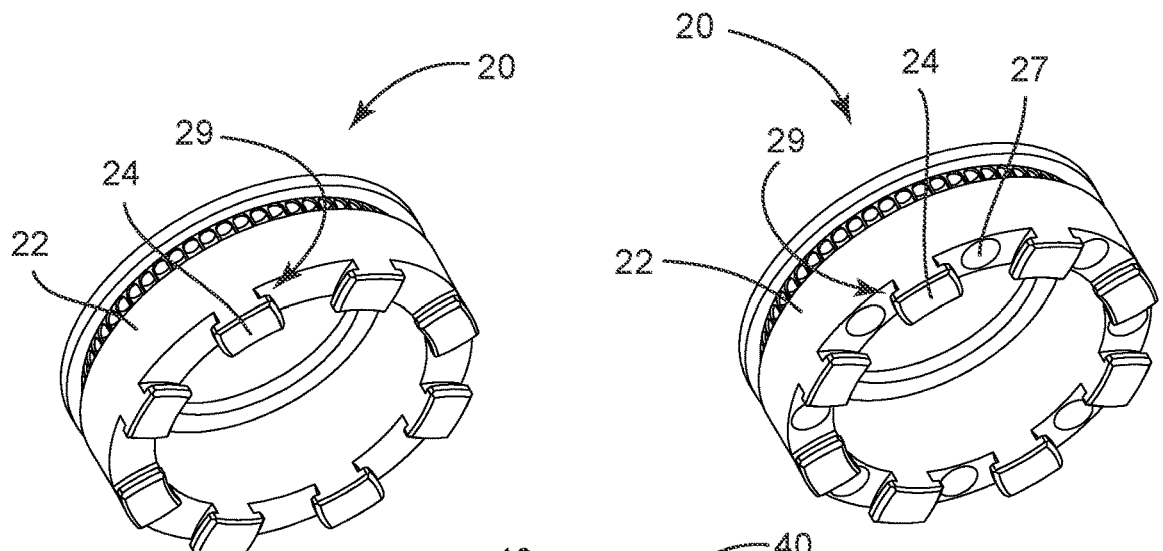
FIG. 16A
FIG. 16B
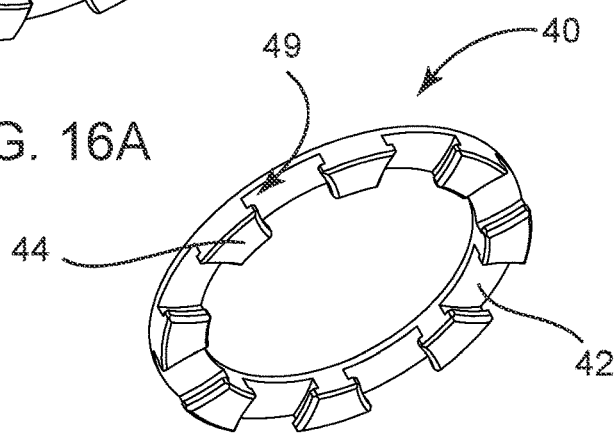
FIG. 16C
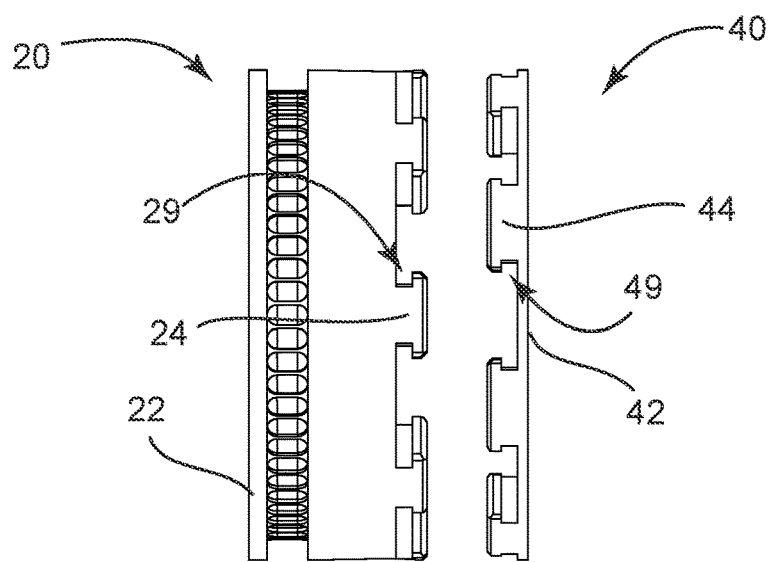
FIG. 16D

# ATTACHMENT SYSTEM FOR COUPLING A MOBILE COMPUTING DEVICE TO OPTICS

BACKGROUND OF THE INVENTION

Technical Field

This invention relates generally to a mobile computing device attachment device and more particularly to an attachment system for coupling a mobile computing device, stand alone camera or the like to optics.

State of the Art

Various types of optics or optic devices are used to view nature/wildlife, for such purposes as studying, enjoyment, hunting and the like. These optics can provide an individual an opportunity to view wildlife from a great distance away. Some individuals want or have need to record wildlife from a distance and conventionally need utilize bulky camera equipment to record wildlife from a distance. There are systems that exist that can connect a mobile computing device to optics in order to record through the optics using the camera system of the mobile computing device. These systems are bulky and difficult to attach and detach from the optics, rendering the mobile computing device difficult to use for any other purpose than as the camera with the optics as the camera lens, and often results in moving the optic, which then requires the user to re-find their object of interest. This makes it difficult to use the mobile computing device for recording nature/wildlife from a distance.

Accordingly, there is a need for an improved attachment device and method for coupling a mobile computing device to optics.

DISCLOSURE OF THE INVENTION

The present invention relates to an attachment system for coupling a mobile computing device to an optic device, the attachment system comprising: an attachment device comprising a first member releasably and magnetically coupled to a second member, wherein: the first member comprises: a first ring shaped base; a first plurality of protrusions extending from a rear side of the ring shaped base, the plurality of protrusions equally spaced apart along the circumference of the ring shaped base forming first channels between the first plurality of protrusions; a front side of the first ring shaped base configured to couple to a mobile computing device; and a first aperture extending through the first member; and the second member comprises: a second ring shaped base; a second plurality of protrusions extending from a front side of the second ring shaped base, the plurality of protrusions equally spaced apart along the circumference of the second ring shaped base forming second channels between the second plurality of protrusions; a rear side of the second ring shaped base configured to couple adjacent a lens of the optic device; and a second aperture extending through the second member, wherein coupling of the first member with the second member aligns axes of the first member and the second member such that the first aperture and the second aperture are aligned providing line-of-sight between a camera of the mobile computing device with the lens of the optic device.

Another embodiment includes an attachment system for coupling a mobile computing device to an optic device, the attachment system comprising: a first member comprises: a first ring shaped base; a first plurality of protrusions extending from a rear side of the ring shaped base, the plurality of protrusions equally spaced apart along the circumference of the ring shaped base forming first channels between the first plurality of protrusions; a front side of the first ring shaped base configured to couple to the mobile computing device; and a first aperture extending through the first member; and an eyepiece for the optic device comprising a second member formed as part of the eyepiece, the second member comprising: a second ring shaped base; a second plurality of protrusions extending from a front side of the second ring shaped base, the plurality of protrusions equally spaced apart along the circumference of the second ring shaped base forming second channels between the second plurality of protrusions; a rear side of the second ring shaped base configured to couple adjacent a lens of the optic device; and a second aperture extending through the second member, wherein coupling of the first member with the second member aligns axes of the first member and the second member such that the first aperture and the second aperture are aligned providing line-of-sight between a camera of the mobile computing device with the lens of the optic device.

Further, another embodiment includes a method of using an attachment system for coupling a mobile computing device to an optic device, the method comprising: coupling a first member of an attachment system to a mobile computing device in a location adjacent a camera of the mobile computing device; coupling a second member of an attachment system to an attachment device adjacent a lens of the optic device or providing an eyepiece of the optic device with the second member formed as part of the eyepiece; releasably and magnetically coupling the first member to the second member; and in response to coupling the first member to the second member, providing a line-of-sight between the camera of the mobile computing device with the lens of the optic device.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 16A is a perspective view of a first member of an attachment device with undercuts in accordance with embodiments;

FIG. 16B is a perspective view of a first member of an attachment device with undercuts and magnets in accordance with embodiments;

FIG. 16C is a perspective view of a second member of an attachment device with undercuts in accordance with embodiments; and FIG. 16D is a perspective view of a first member being coupled to a second member of an attachment device with the use of undercuts in accordance with embodiments.

DETAILED DESCRIPTION OF EMBODIMENTS OF THE INVENTION

As discussed above, embodiments of the present invention relate an attachment system for coupling a mobile computing device or a stand alone camera (such as a smaller camera) to an optic device, such as, but not limited to a scope or binoculars.

Figure 1A:
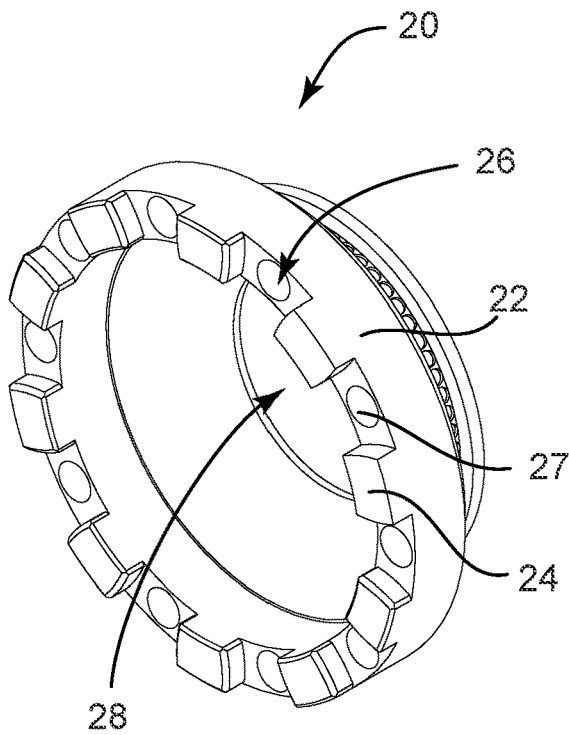
FIG. 1A is a perspective view of a first member of an attachment device of an attachment system in accordance with embodiments.
Figure 1C:
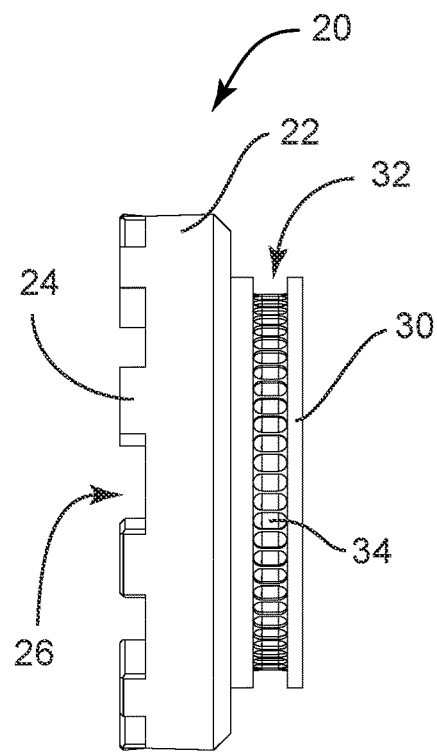
FIG. 1C is a side view of a first member of an attachment device of an attachment system in accordance with embodiments.
Figure 1B:
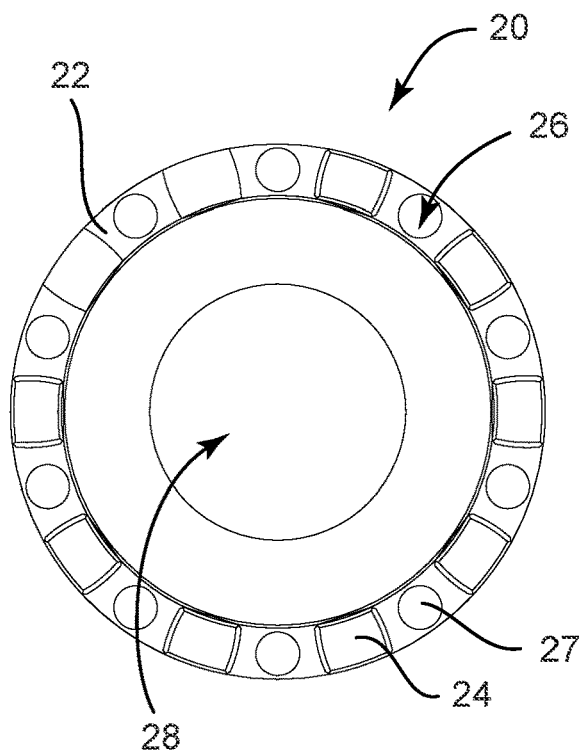
FIG. 1B is a rear view of a first member of an attachment device of an attachment system in accordance with embodiments.
Figure 1D:
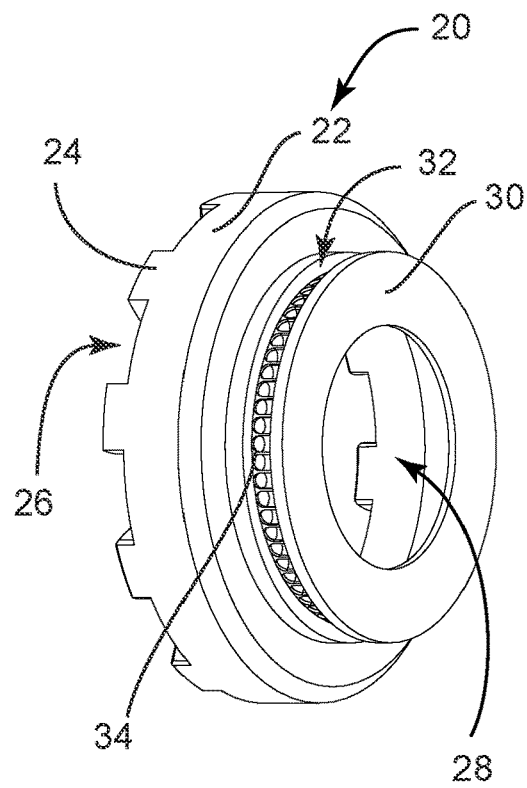
FIG. 1D is a front perspective view of a first member of an attachment device of an attachment system in accordance with embodiments.
Figure 2A:
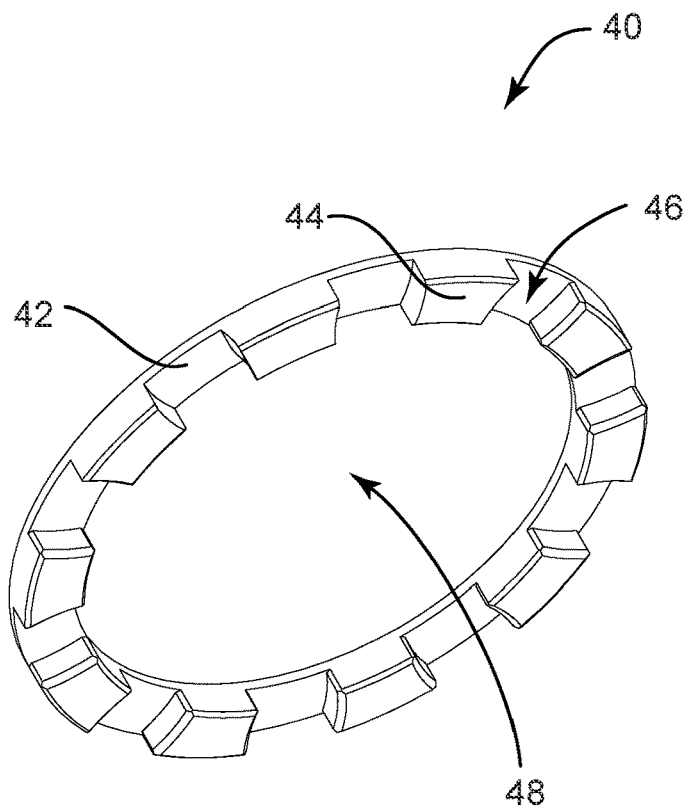
FIG. 2A is a perspective view of a second member of an attachment device of an attachment system in accordance with embodiments.
Figure 2B:
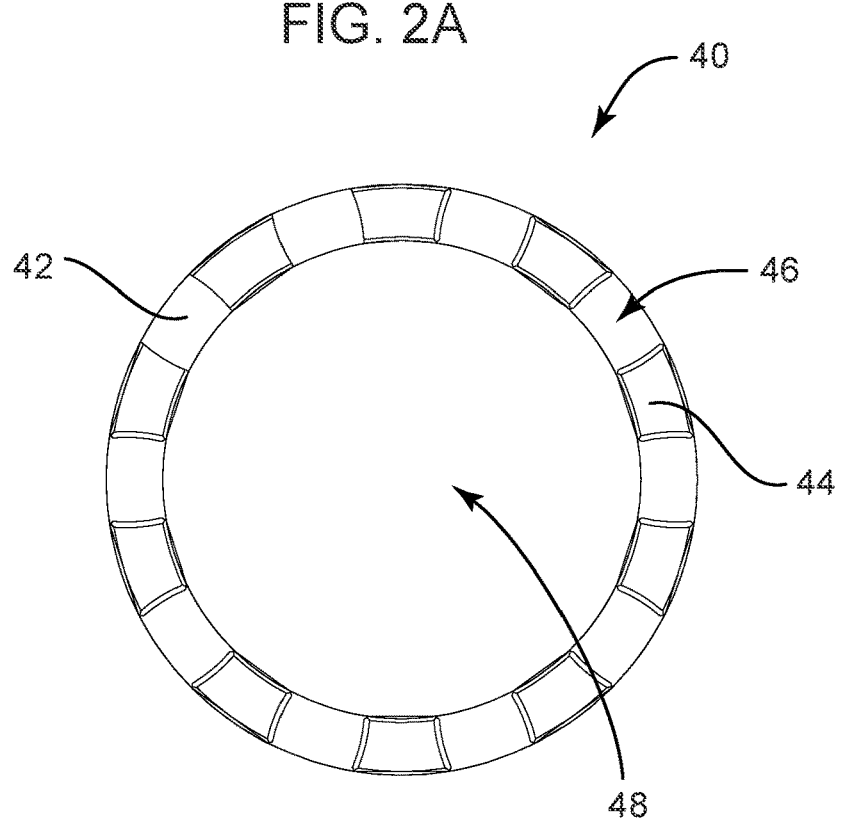
FIG. 2B is a front view of a second member of an attachment device of an attachment system in accordance with embodiments.
Figure 3:
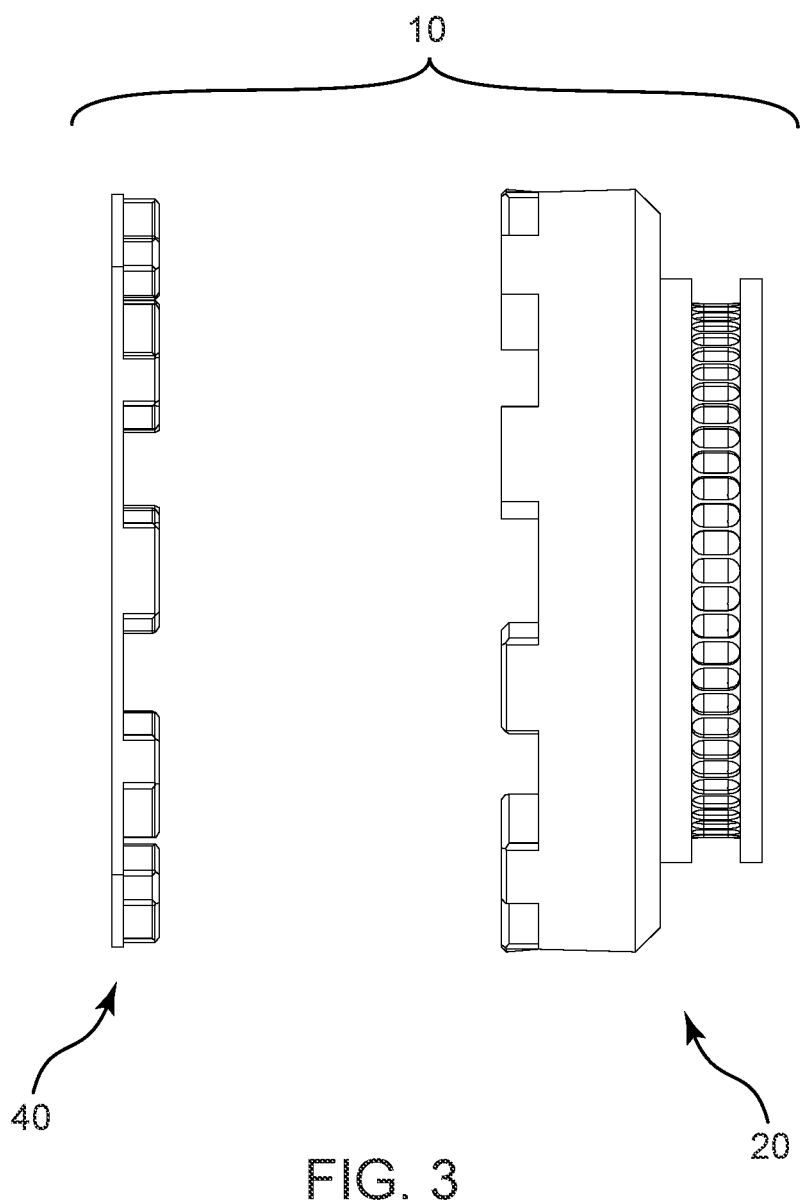
FIG. 3 is an exploded side view of a portion of an attachment device of an attachment system in accordance with embodiments.
Figure 4:
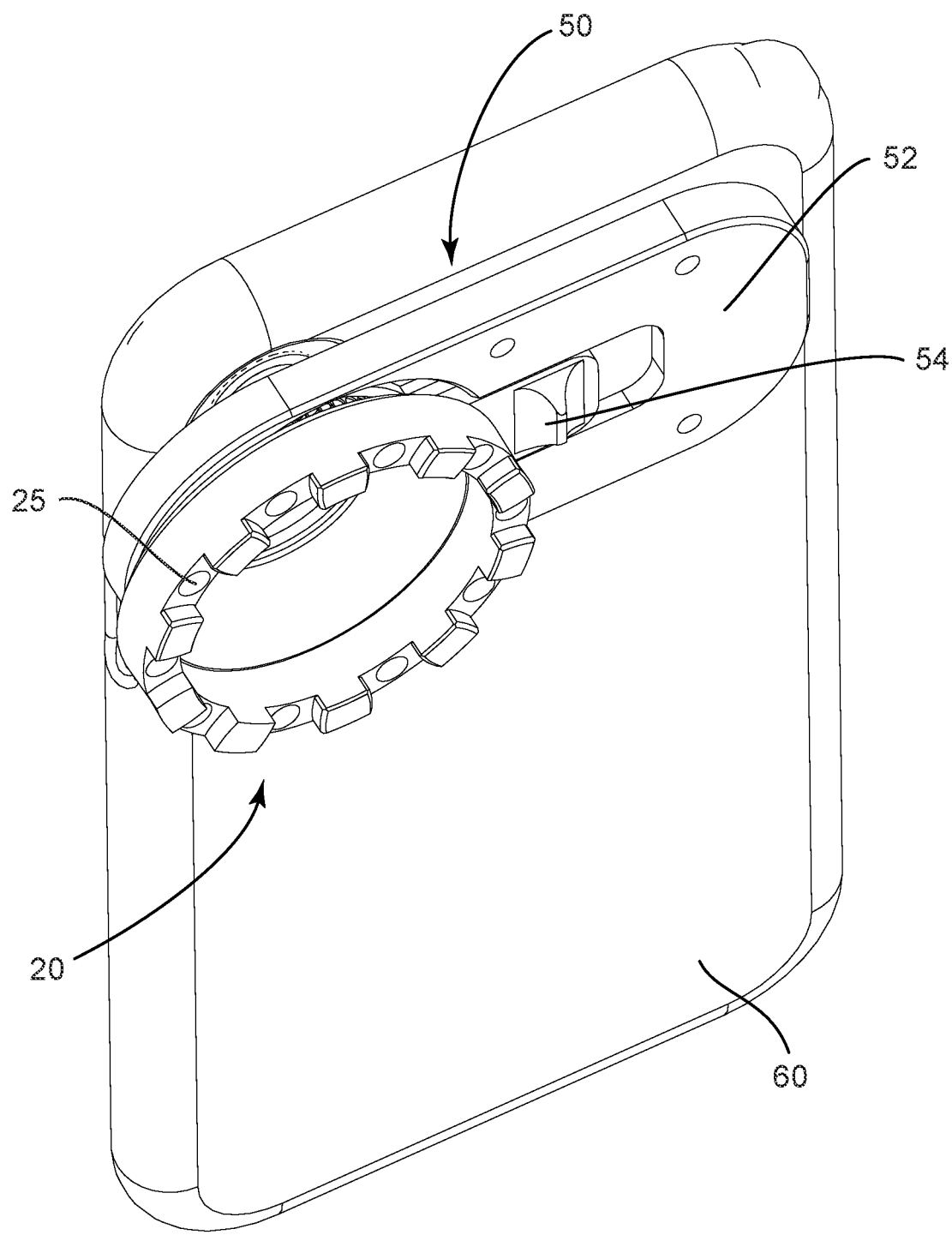
FIG. 4 is a perspective view of a first member of an attachment device coupled to a mobile computing device in accordance with embodiments.
Figure 5:
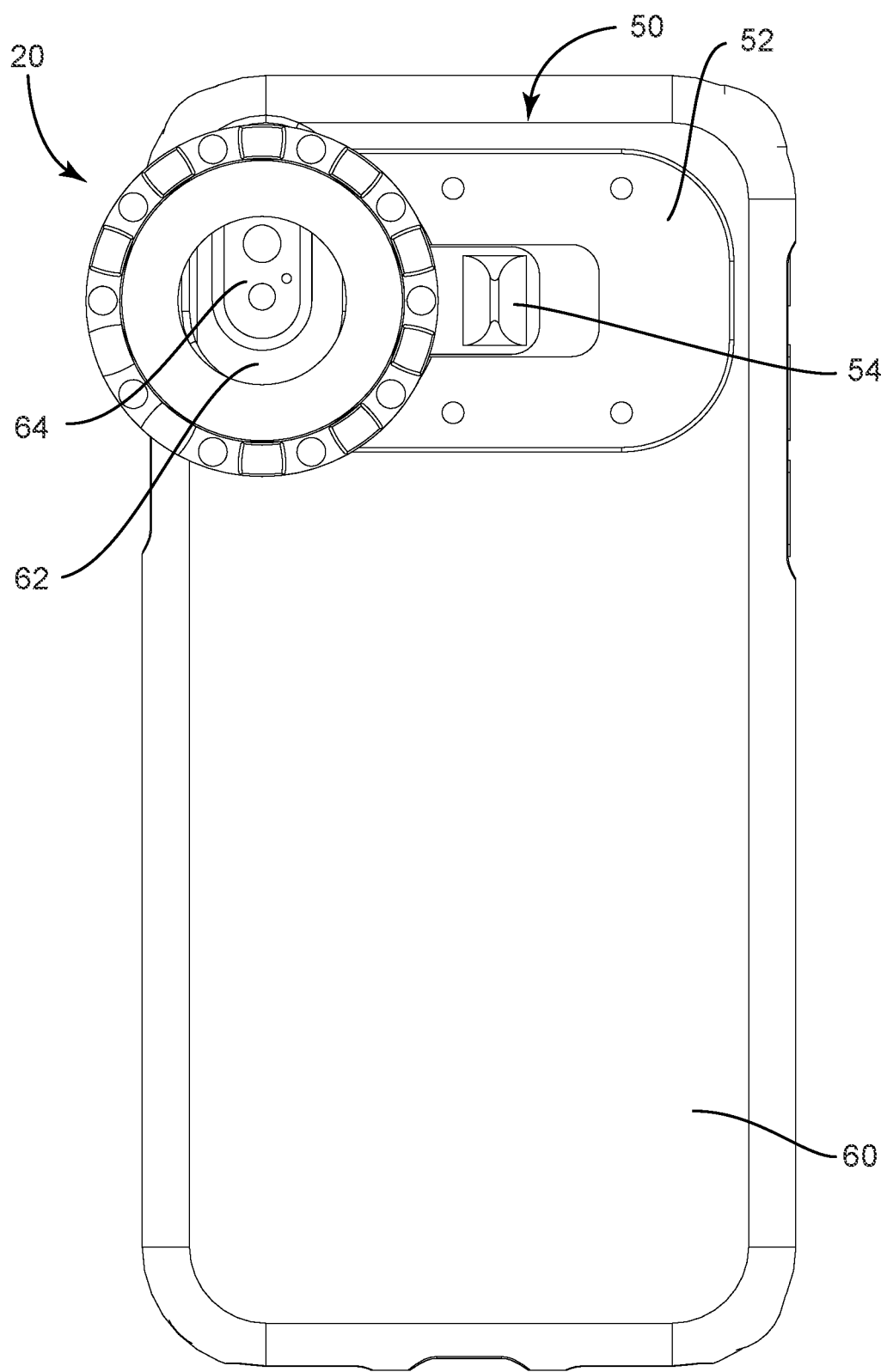
FIG. 5 is a rear view of a first member of an attachment device coupled to a mobile computing device in accordance with embodiments.
Figure 6:
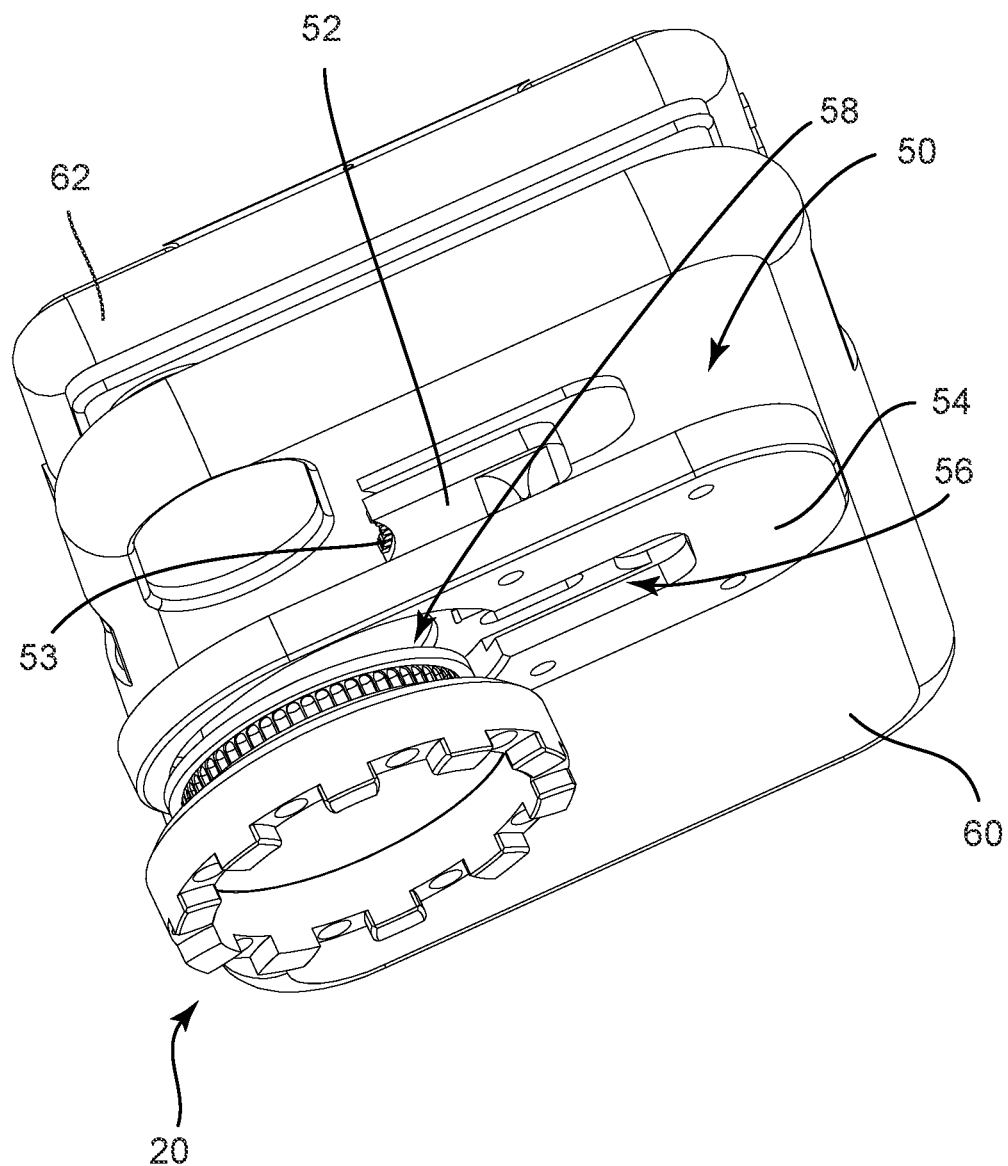
FIG. 6 is a perspective exploded view of an attachment device coupled to a mobile computing device in accordance with embodiments.

Referring to the drawings, FIGS. 1A-10 depict an embodiment of an attachment system comprising an attachment device 10 having a first member 20 and a second member 40, wherein the attachment system may include a mounting device 50 and a mobile computing device case 60. In general, FIGS. 1A-3 depict an embodiment of the attachment device 10, FIGS. 4-6 depict embodiments of the mounting device 50 and mobile computing device case 60, and FIGS. 7-10 depict embodiments of releasably coupled a mobile computing device 62 to an optic device 80, 90 with line-of-sight between a camera of the mobile computing device 62 and a lens of the optic device 80, 90. A mobile computing device 62 may be a phone, a smartphone, a tablet or the like that includes processing capabilities and a camera such as camera 64. While it is shown in the drawing figures and discussed in this disclosure that a mobile computing device 61 is utilized with the attachment device 10, it will be understood that the a stand alone camera may also be used in a similar manner as the mobile computing device 62 without deviating from the scope of this invention.

Referring to FIGS. 1A-3, an embodiment of the attachment device 10 is shown. The attachment device 10 comprises a first member 20 releasably coupled to a second member 40. The first member 20 may include a first ring shaped base 22 with a first plurality of protrusions 24 extending from a rear side of the ring shaped base 22. The first plurality of protrusions 24 may be equally spaced apart along the circumference of the ring shaped base 22 forming first channels 26 between the first plurality of protrusions 24, wherein the channels 26 may be radial channels. A recess 27 may be formed within each of the first channels 26, wherein each recess 27 is sized and shaped to receive and retain a magnet 25 (see FIG. 4). The magnet 25 operates to releasably couple the first member 20 to the second member 40, wherein the second member 40 is magnetically attractive. A front side of the first ring shaped base 22 may be configured to couple to a mobile computing device. In an embodiment, a coupling member 30 may extend from the front side of the first ring shaped base 22. The coupling member 30 may include a groove 32 formed along a circumferential outer surface of the coupling member 30, wherein a plurality of recesses 34 are formed within the groove 32. The groove 32 and the plurality of recesses operate to couple to a mounting device 50 as will be discussed later with reference to FIGS. 4-6. Further, the recesses 34 allow the user to adjust the rotation of the ring 20 when attaching it to the phone in order to align the image presented on the camera horizontally or vertically. The first member 20 may also comprise a first aperture 28 extending through the first member 20.

The second member 40 may include a second ring shaped base 42 with a second plurality of protrusions 44 extending from a front side of the second ring shaped base 42. The second plurality of protrusions 44 equally spaced apart along the circumference of the second ring shaped base 42 forming second channels 46 between the second plurality of protrusions 42, wherein the channels 46 may be radial channels. A rear side of the second ring shaped base 42 may be configured to couple adjacent a lens of an optic device (See FIGS. 7 and 9). The second member 40 may include a second aperture 48 extending through the second member 40.

In operation, coupling of the first member 20 with the second member 40 includes extending the first plurality of protrusions 24 within the second channels 46 and the second plurality of protrusions 44 within the first channels 26, wherein the magnets 25 coupled to the first member 20 are magnetically coupled to the second plurality of protrusion of the second member 40. The coupling of the first member 20 with the second member 40 aligns axes of the first member 20 and the second member 40 such that the first aperture 28 and the second aperture 48 are aligned providing line-of-sight between a camera of the mobile computing device with the lens of the optic device (see FIGS. 5, 8 and 10).

Referring additionally to FIGS. 4-6, the attachment system may further include a mounting device 50 comprising a base 52 coupled to mobile computing device case 60. The base 52 may be removably coupled or fixedly coupled to the case 60. The mounting device 50 further includes a locking mechanism 54. The base 52 includes a slot 56 with an aperture 58 at an end of the slot 56. The locking mechanism 52 is slidingly coupled within the slot 56 and is biased toward to the aperture 58. An end of the locking mechanism 54 that is closest to the aperture 58 may be sized and shaped to engage the groove 32 of the first member 20 of the attachment device 10. Further, the end may include a plurality of protrusions 53 that engage a portion of the plurality of recesses 34 within the groove 32. Accordingly, the base 52 may be coupled to the case 60 with the aperture 58 over the aperture of the case corresponding to a camera 64 of the mobile computing device 62. The locking mechanism 54 may be slid away from the aperture 58 to provide enough room for the coupling member 30 of the first member 20 to be inserted within the aperture 58, wherein the locking mechanism may be moved toward the aperture either manually or through a biasing member (spring) pushing it toward the aperture 58, wherein the locking mechanism engages the groove 32 and a portion of the recesses 34 of the coupling member 30, whereby releasably securing the first member to the case 60. The case 60 operates to couple to the mobile computing device 62 as any other case does and operates to couple the first member 20 to the mobile computing device 62, wherein the user may adjust the rotation of the ring 20 when attaching it to the phone in order to align the image presented on the camera horizontally or vertically.

Figure 7:
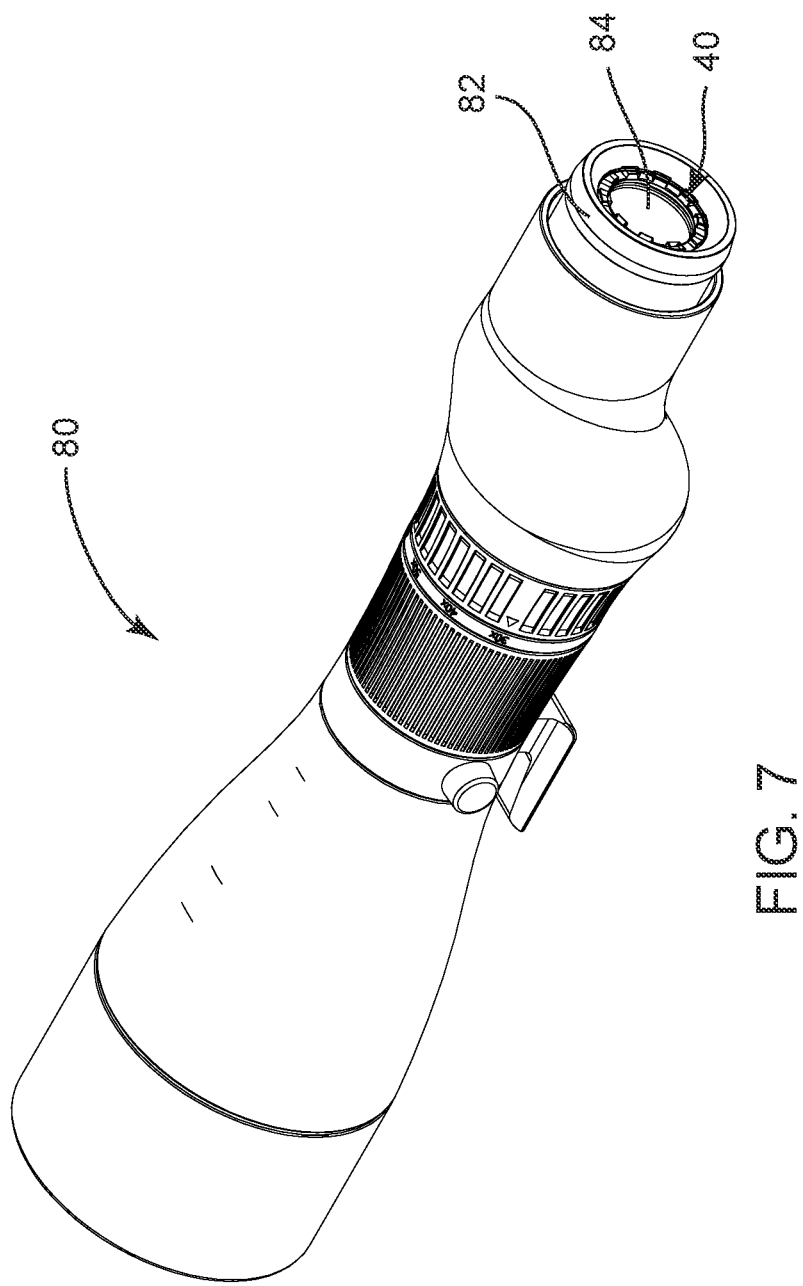
FIG. 7 is a perspective view of a scope with a second member of an attachment device coupled to the scope in accordance with embodiments.
Figure 8:
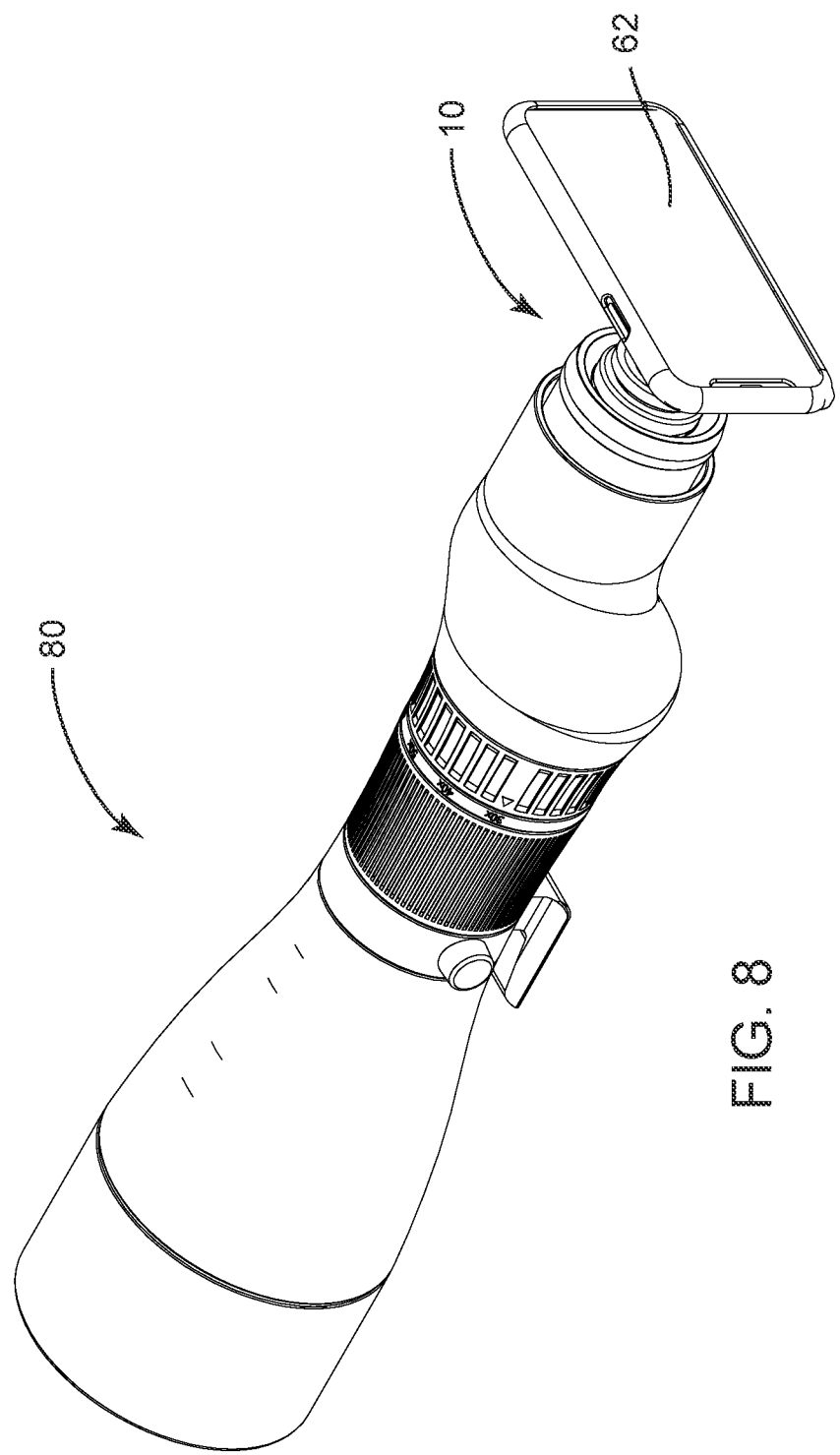
FIG. 8 is a perspective view of a scope with a mobile computing device coupled to the scope with an attachment system in accordance with embodiments.
Figure 9:
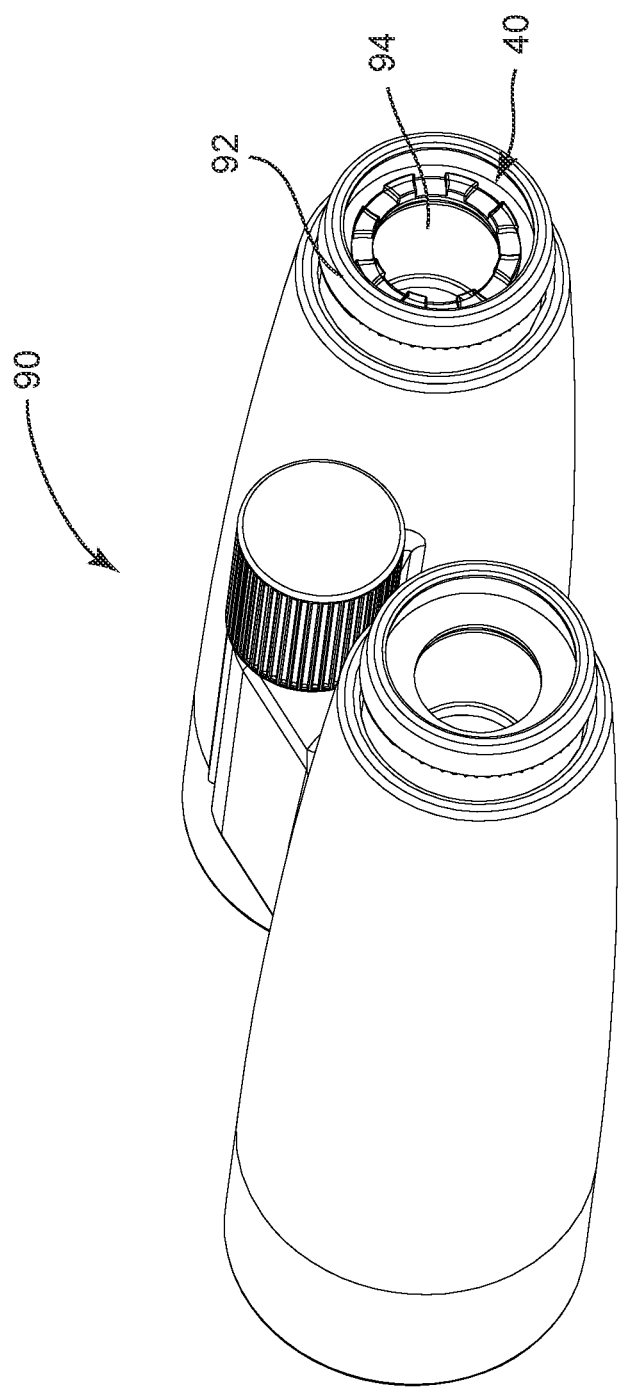
FIG. 9 is a perspective view of a binocular with a second member of an attachment device coupled to the binocular in accordance with embodiments.
Figure 10:
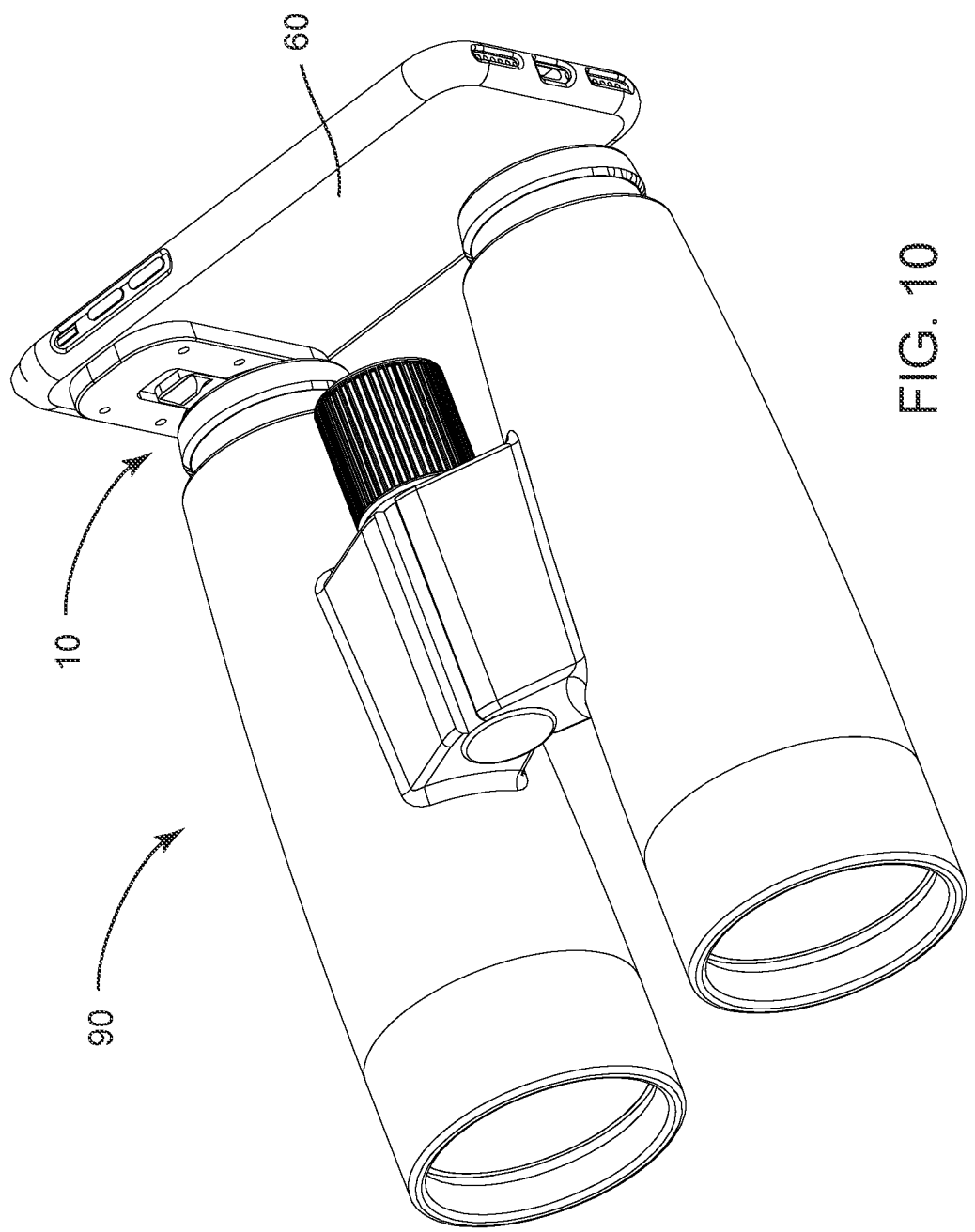
FIG. 10 is a perspective view of a binocular with a mobile computing device coupled to the binocular with an attachment system in accordance with embodiments.

Referring additionally to FIGS. 7-10, the second member 40 of the attachment device 10 may be coupled adjacent a lens of an optic device. As shown in FIG. 7, the second member 40 is coupled to adjacent to the lens 84 of the scope 80. This may include coupling directly to the lens 84 or to the eyepiece 82. As shown in FIG. 9, the second member 40 is coupled to adjacent to one lens 94 of the binoculars 90. This may include coupling directly to the lens 94 or to an eyepiece 92. With the second member 40 coupled to the optic device 80, 90, the first member 20 coupled to the mobile computing device 62 may then be coupled to the second member 40, wherein all of the apertures 28, 48 and 58 in the components of the attachment system operate to provide a line-of-sight from the camera 64 of the mobile computing device 62 and the lens 84, of the optic device 80, 90. The mobile computing device 62 and the camera 64 of the mobile computing device 62 may then operate to record either by photo or video, what is being viewed by the optic device 80, 90. This allows a simple mobile computing device 62 to operate as a camera with high zoom functionality of the optic devices 80, 90. Additionally, the magnetic coupling allows the mobile computing device 62 to be easily removed from the optic device 80, 90 and the low profile, small size of the first member 20 does not impede typical use of the phone 62 or storage in clips, pockets, bags or the like. Further still, the use of second member 40 and first member 20 to remove the mobile computing device 62 from the optic device 80, 90 allows un-impeded use of the optic device 80, 90.

While it is depicted that the magnets are utilized to couple the first member 20 to the second member 40, other methods of coupling are contemplated. For example, and without limitation, the attachment device 10, as shown in FIGS. 16A-16D could also utilize undercuts 29 on the protrusions of the first member 20 and undercuts 49 on the second member 40 so that when they are interfaced with each other, the first member 20 and the second member 40 may be rotated with respect to each other to interlock the undercuts 29 and 49 to offer a benefit of mechanical locking. This undercut method may also be used in conjunction with a magnetic coupling (see FIG. 16B) to further strengthen the coupling between the first member 20 and the second member 40. Further, the first member 20 and the second member 40 may be coupled together using protrusions on one of the members and recesses or pockets on the other, such that protrusion may be received within the recesses or pockets when the first member 20 is magnetically coupled to the second member 40.

Figure 11:
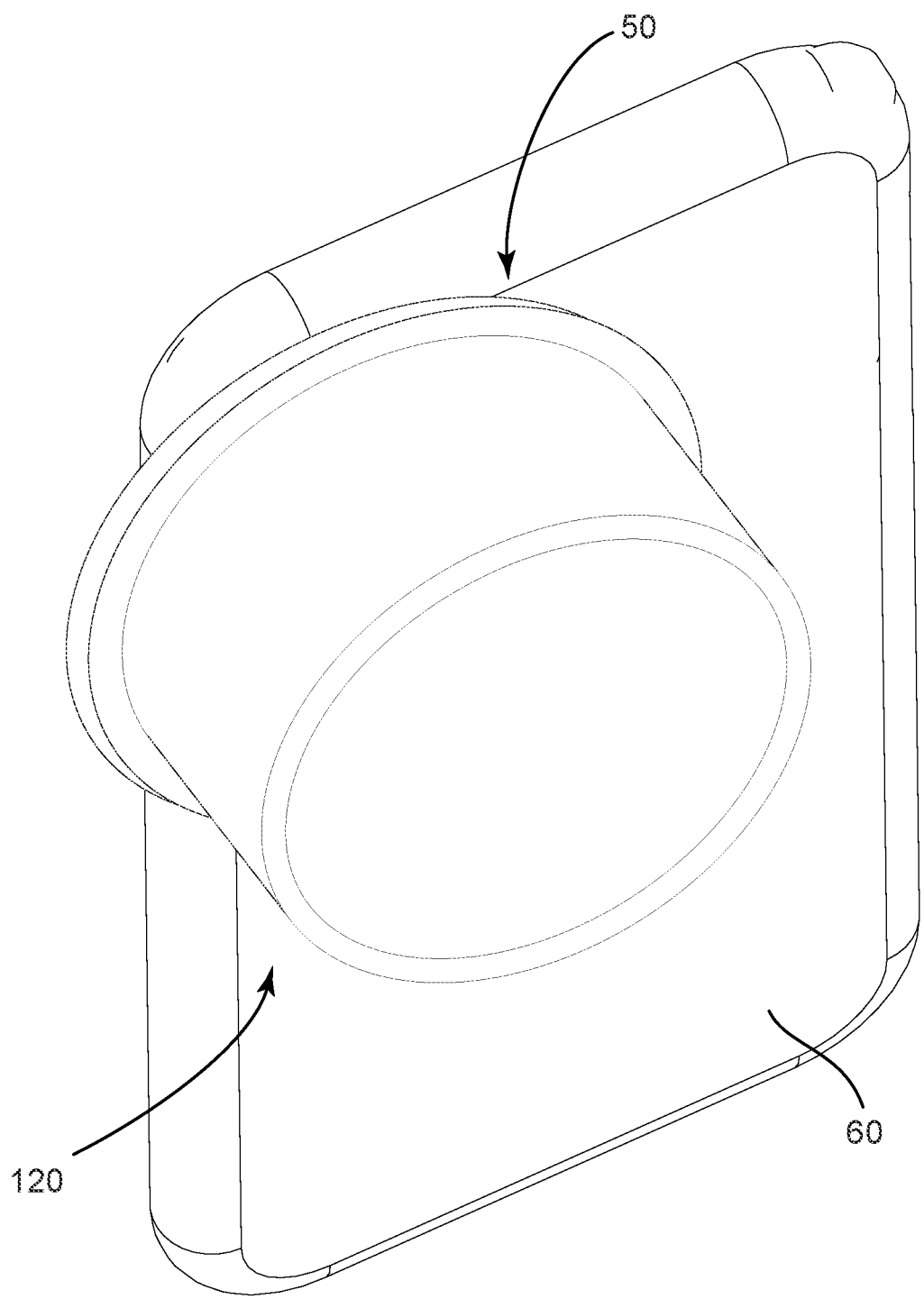
FIG. 11 is a perspective view of an eyepiece attachment device coupled to a mobile computing device in accordance with embodiments.
Figure 12:
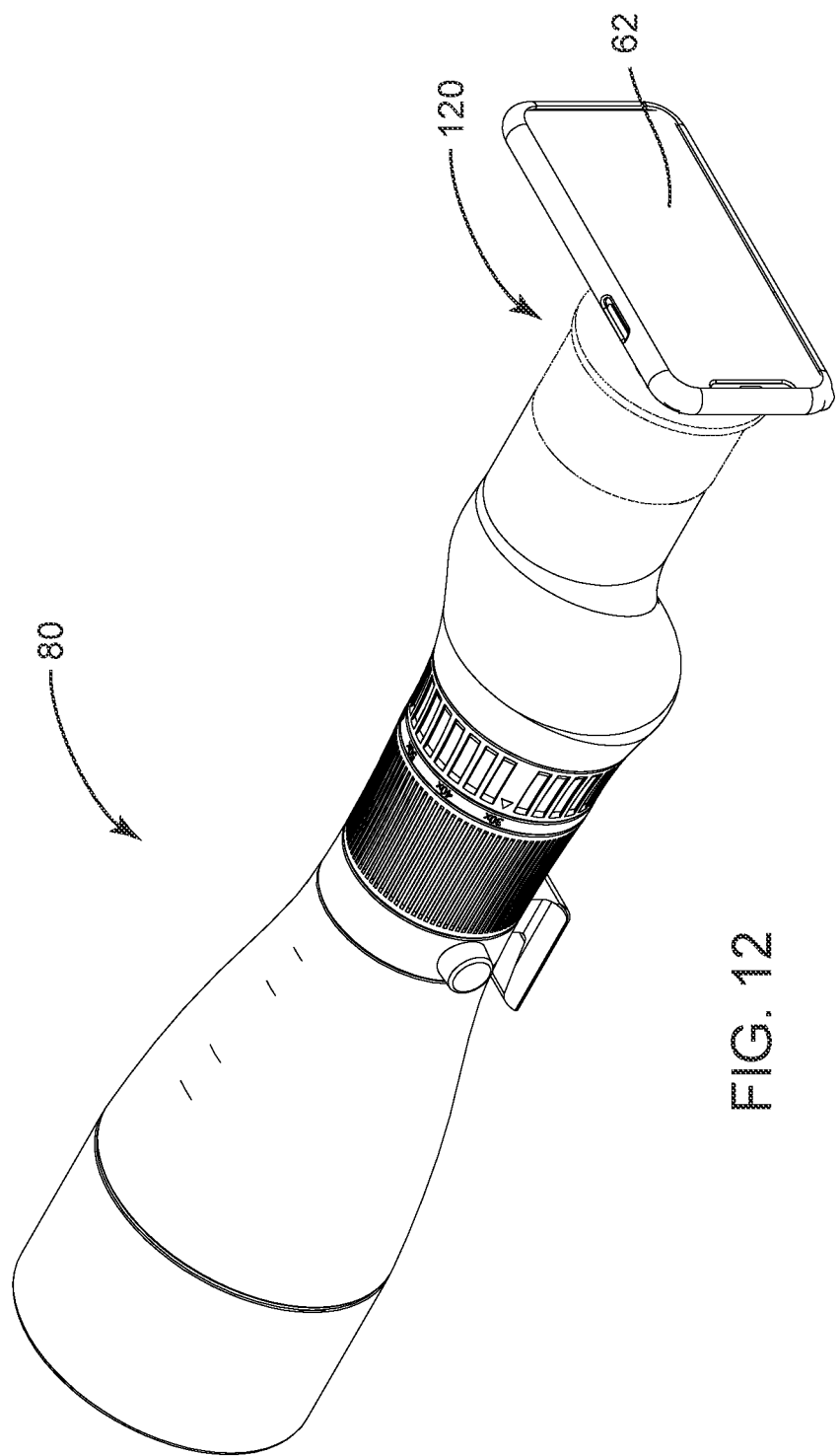
FIG. 12 is a perspective view of a scope with a mobile computing device coupled to the scope with an attachment system in accordance with embodiments.

Another embodiment is depicted in FIGS. 11-12. The attachment system may include an eyepiece attachment device 120 coupled to a case 60 as shown in FIG. 11. The eyepiece attachment device 120 may include a cylindrical shape with an aperture that extends through it. In operation, eyepiece attachment device 120 may be coupled around an eyepiece 82 of the scope 80 as shown in FIG. 12. The aperture of the eyepiece attachment device 120 may be located over the opening for a camera 64 of the mobile computing device 62. This allows for line-of-sight between a camera 64 of the mobile computing device 62 with the lens 84 of the optic device 80. The mobile computing device 62 and the camera 64 of the mobile computing device 62 may then operate to record either by photo or video, what is being viewed by the optic device 80. This allows a simple mobile computing device 62 to operate as a camera with high zoom functionality of the optic devices 80. The eyepiece attachment device 120 may be coupled around the eyepiece 82 by use of mechanical means such as a bolt or may be attached magnetically. The eyepiece attachment device 120 may be releasably coupled or fixedly coupled to the case 60. While FIGS. 11 and 12 depict the eyepiece attachment device 120 coupled to a scope 80, it may be used with other optic devices like binoculars and the like.

Figure 13:
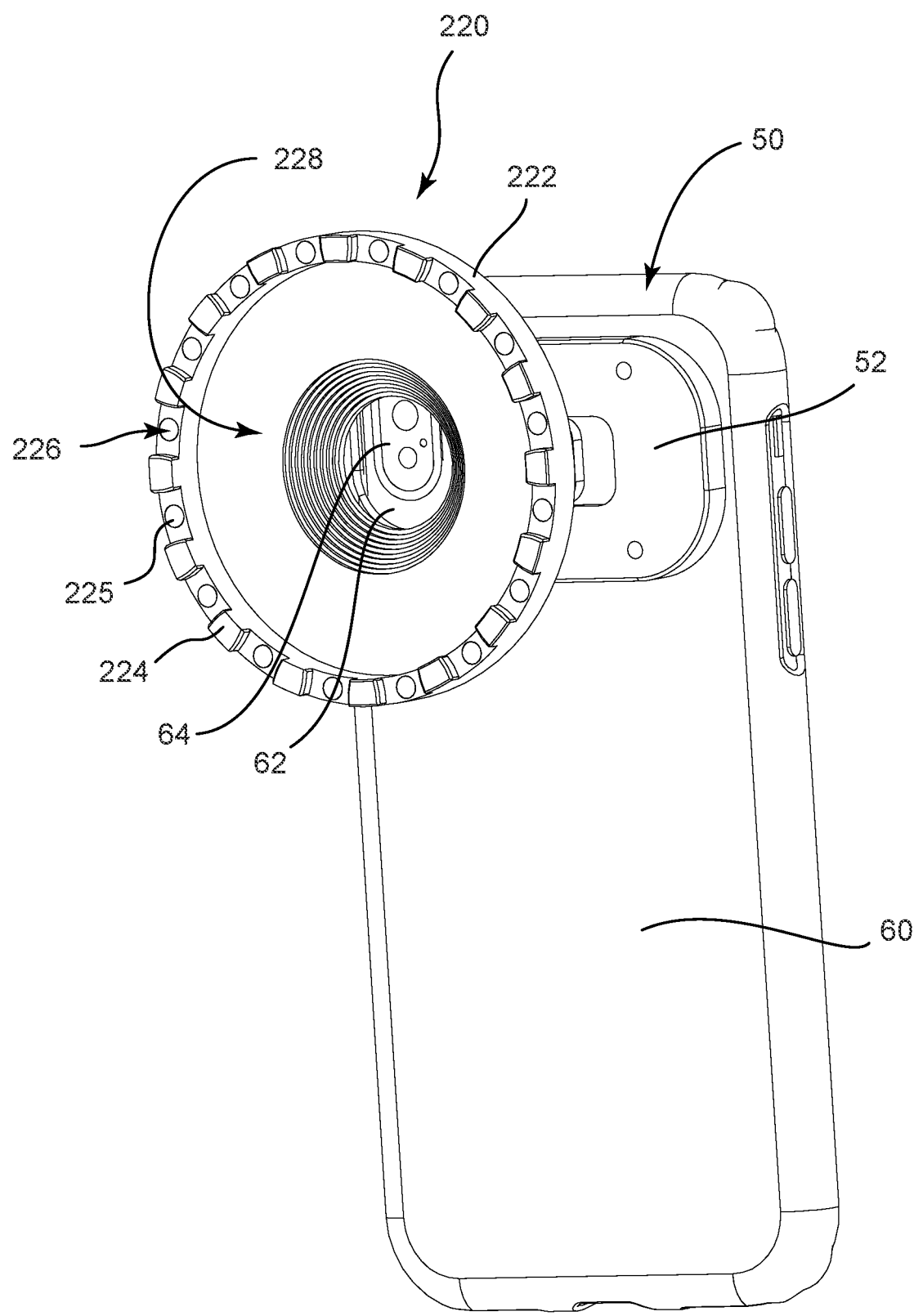
FIG. 13 is a perspective view of an attachment device coupled to a mobile computing device in accordance with embodiments.
Figure 14:
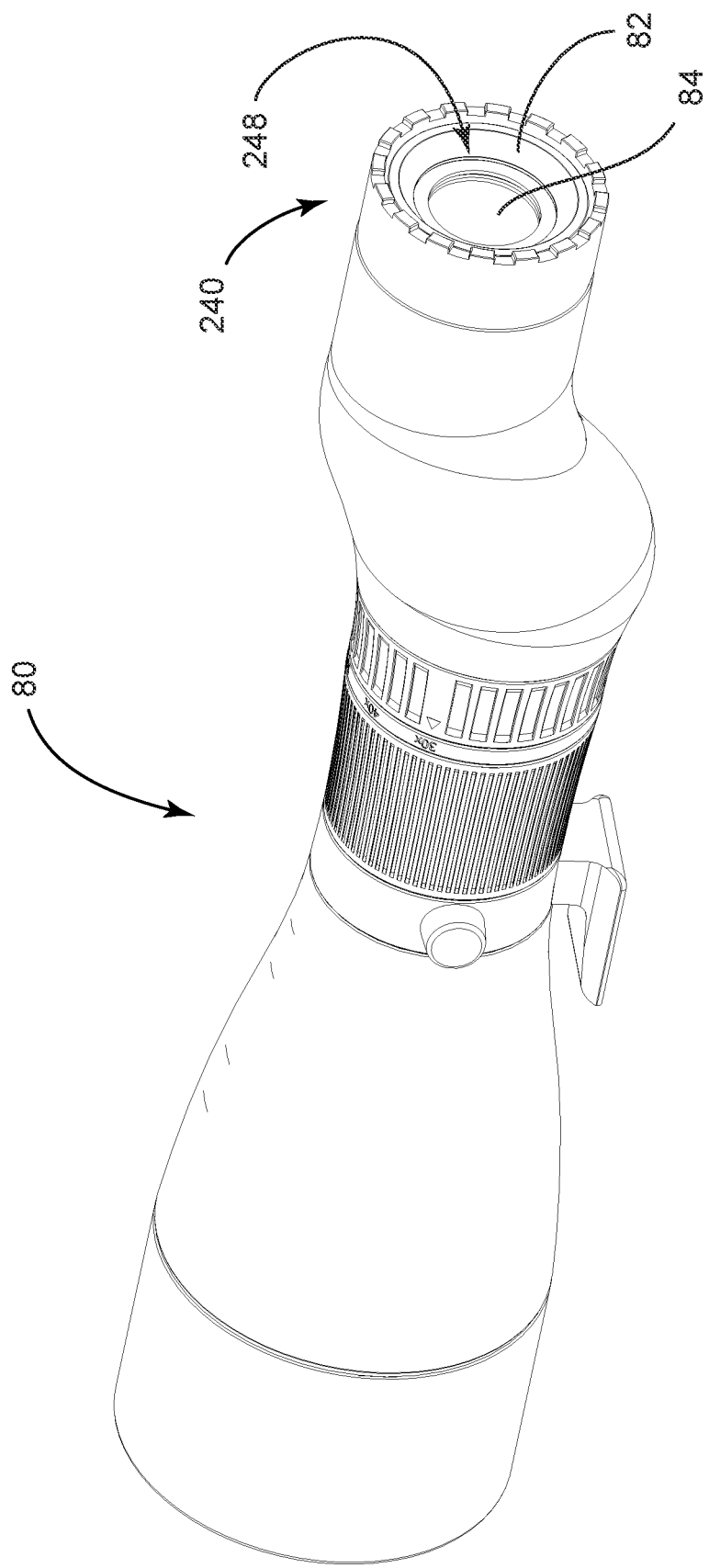
FIG. 14 is a perspective view of a scope with a second member of an attachment device coupled to the scope in accordance with embodiments.
Figure 15:
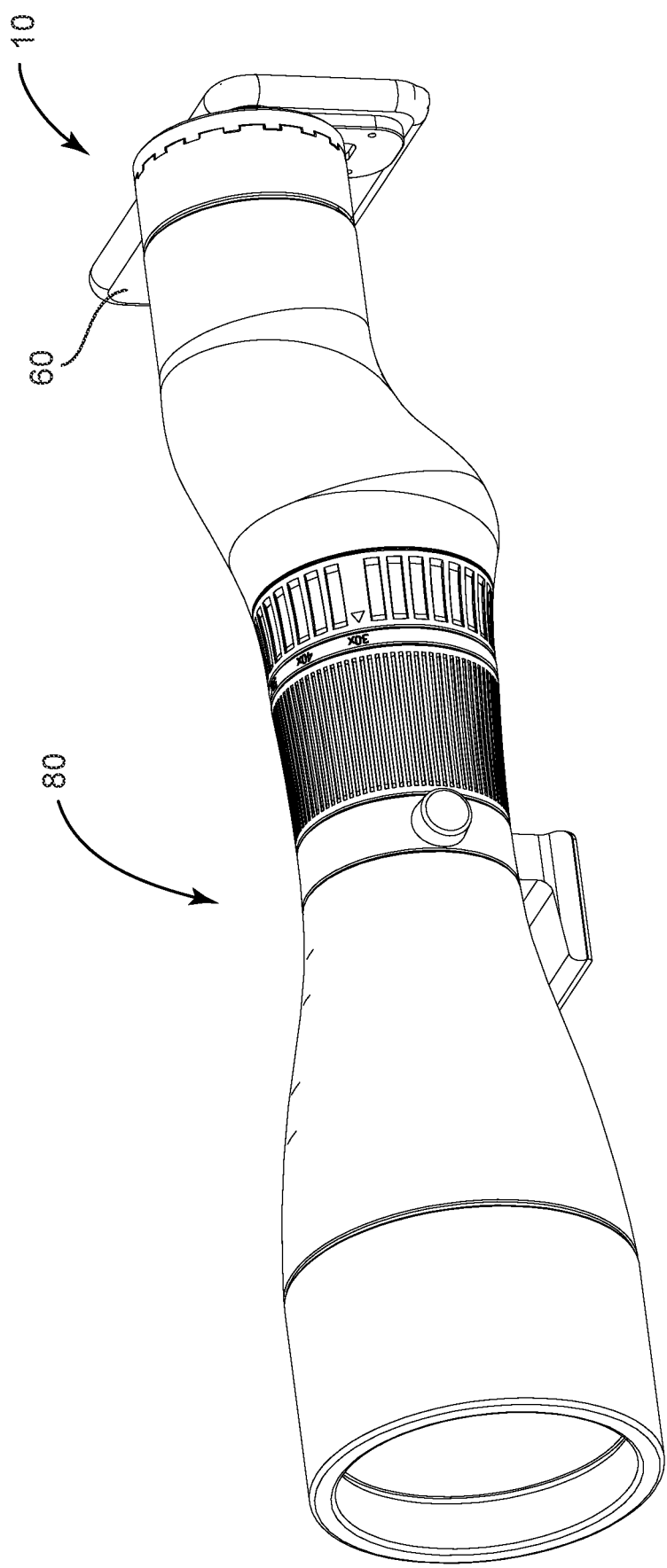
FIG. 15 is a perspective view of a scope with a mobile computing device coupled to the scope with an attachment system in accordance with embodiments.

Yet, another embodiment is depicted in FIGS. 13-15, that are similar to the embodiment depicted in FIGS. 1A-10. As shown in FIG. 13, a first member 220 may be coupled to a mounting device 50 comprising a base 52 coupled to mobile computing device case 60. The first member 220 may include a first ring shaped base 222 with a first plurality of protrusions 224 extending from a rear side of the ring-shaped base 222. The first plurality of protrusions 224 may be equally spaced apart along the circumference of the ring-shaped base 222 forming first channels 226 between the first plurality of protrusions 224, wherein the channels 26 may be radial channels. A recess 227 may be formed within each of the first channels 226, wherein each recess 27 is sized and shaped to receive and retain a magnet 225. The magnet 225 operates to releasably couple the first member 220 to a second member 240, wherein the second member 240 is magnetically attractive. The first member 220 is coupled to the mounting device 50 in a manner as described above with regard to first member 20 being coupled to mounting device 50.

As shown in FIG. 14, the second member 240 is coupled to adjacent to the lens 84 of the scope 80 by coupling around the eyepiece 82. Referring further to FIG. 15, with the second member 40 coupled to the optic device 80, the first member 220 coupled to the mobile computing device 62 may then be coupled to the second member 40, wherein all of the apertures 228, 248 and 58 in the components of the attachment system operate to provide a line-of-sight from the camera 64 of the mobile computing device 62 and the lens 84, of the optic device 80. The mobile computing device 62 and the camera 64 of the mobile computing device 62 may then operate to record either by photo or video, what is being viewed by the optic device 80. This allows a simple mobile computing device 62 to operate as a camera with high zoom functionality of the optic device 80. Additionally, the magnetic coupling allows the mobile computing device 62 to be easily removed from the optic device 80 and the low profile, small size of the first member 220 does not impede typical use of the phone 62 or storage in clips, pockets, bags or the like. Further still, the use of second member 240 and first member 220 to remove the mobile computing device 62 from the optic device 80 allows un-impeded use of the optic device 80. While this embodiment is shown being used with a scope 80, it is understood that this can be used with other optic devices such as, but not limited to, binoculars.

It is contemplated that embodiments of the attachment device 10 may be implemented as an aftermarket product to couple to existing optics. Additionally, the attachment device 10 may implemented as an OEM system/design, where manufactures machine the protrusions/features into the optics themselves, so stock optics right out of the box are compatible with phones outfitted with the mounting device 50 and first member 20, 220. For example, and without limitation, the eyepiece 82 of FIG. 7 and the eyepiece 92 of FIG. 9 may be manufactured with the second member 40 being a component of the eyepiece 82, 92. This also allows optics companies to sell replacement eyepieces for older model optics that have the necessary protrusions/features. This way users could buy just a replacement eyepiece for their older optics and then install on their optics, allowing use of their phones outfitted with the mounting device 50 and first member 20, 220. Further, if the eyepiece 82,92 are damaged, it can be replaced easily by purchasing a new eyepiece.

Accordingly, the components defining any attachment system for coupling a mobile computing device to an optic device may be formed of any of many different types of materials or combinations thereof that can readily be formed into shaped objects provided that the components selected are consistent with the intended operation of an attachment system. For example, the components may be formed of: rubbers (synthetic and/or natural) and/or other like materials; glasses (such as fiberglass) carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Furthermore, the components defining any attachment system for coupling a mobile computing device to an optic device may be purchased pre-manufactured or manufactured separately and then assembled together. However, any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components. Other possible steps might include sand blasting, polishing, powder coating, zinc plating, anodizing, hard anodizing, and/or painting the components for example.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. An attachment system for coupling a mobile computing device to a spotting scope or binoculars, the attachment system comprising:
   an attachment device comprising a first member releasably and magnetically coupled to a second member, wherein:
   the first member comprises:
      a first ring shaped base;
      a first plurality of protrusions extending from a rear side of the ring shaped base and extending parallel to an axis of the first ring shaped base, the plurality of protrusions equally spaced apart along the circumference of the ring shaped base forming radial first channels between the first plurality of protrusions;
      a front side of the first ring shaped base comprising a coupling member extending from the front side of the first ring shaped base, the coupling member having a plurality of recesses are formed along a circumferential outer surface of the coupling member, wherein the coupling member is coupled to a mobile computing device with a sliding locking mechanism comprising a plurality of protrusions that engage a portion of the plurality of recesses of the coupling member of the first ring shaped base to couple the coupling member to the mobile computing device; and
      a first aperture extending through the first member; and
   the second member comprises:
      a second ring shaped base;
      a second plurality of protrusions extending from a front side of the second ring shaped base and extending parallel to an axis of the second ring shaped base, the plurality of protrusions equally spaced apart along the circumference of the second ring shaped base forming radial second channels between the second plurality of protrusions;
      a rear side of the second ring shaped base coupled to an eyepiece of the spotting scope or binoculars; and
      a second aperture extending through the second member, wherein coupling of the first member with the second member aligns axes of the first member and the second member such that the first aperture and the second aperture are aligned providing line-of-sight between a camera of the mobile computing device with the lens of the spotting scope or binoculars, the line-of-sight extending through the first member and the second member of the attachment system.

2. The attachment system of claim 1, further comprising a mounting device coupled to a case for the mobile computing device.

3. The attachment system of claim 2, wherein first member is releasably coupled to the mounting device.

4. The attachment system of claim 3, wherein the mounting device comprises a base coupled to the case and a locking mechanism slidably coupled to the base.

5. The attachment system of claim 4, wherein the base includes a slot and an aperture at the end of the slot, wherein the locking mechanism slides within the slot and is moveable between a locking position engaging the first member or an unlocked position disengaged from the first member.

6. The attachment system of claim 5, wherein the first member further comprises a coupling member extending from a front side of the first ring shaped base, the coupling member comprising a groove with a plurality of recesses within the groove.

7. The attachment system of claim 6, wherein the locking mechanism engages the groove.

8. The attachment system of claim 7, wherein the locking mechanism comprises protrusions extending from an end of the locking mechanism, wherein the protrusion engage a portion of the recesses in the groove of the coupling member of the first member of the attachment device when the locking mechanism engages the groove.

9. The attachment system of claim 1, wherein the first ring shaped base comprises a recess in each of the first channels.

10. The attachment system of claim 9, further comprising a magnet coupled within each recess in each of the first channels.

11. The attachment system of claim 10, wherein the second member is magnetically attractive.

12. The attachment system of claim 11, wherein coupling of the first member with the second member comprises extending the first plurality of protrusions within the second channels and the second plurality of protrusions within the first channels, wherein the magnets coupled to the first member are magnetically coupled to the second plurality of protrusion of the second member.

13. An attachment system for coupling a mobile computing device
to a spotting scope or binoculars, the attachment system comprising:
a first member comprises:
a first ring shaped base;
a first plurality of protrusions extending from a rear side of the ring shaped base and extending parallel to an axis of the first ring shaped base, the plurality of protrusions equally spaced apart along the circumference of the ring shaped base forming radial first channels between the first plurality of protrusions;
a front side of the first ring shaped base comprising a coupling member extending from the front side of the first ring shaped base, the coupling member having a plurality of recesses are formed along a circumferential outer surface of the coupling member, wherein the coupling member is coupled to the mobile computing device with a sliding locking mechanism comprising a plurality of protrusions that engage a portion of the plurality of recesses of the coupling member of the first ring shaped base to couple the coupling member to the mobile computing device; and
a first aperture extending through the first member; and
an eyepiece for the spotting scope or binoculars comprising a second member formed as part of the eyepiece, the second member comprising:
a second ring shaped base;
a second plurality of protrusions extending from a front side of the second ring shaped base and extending parallel to an axis of the second ring shaped base, the plurality of protrusions equally spaced apart along the circumference of the second ring shaped base forming radial second channels between the second plurality of protrusions;
a rear side of the second ring shaped base located adjacent a lens of the spotting scope or binoculars; and
a second aperture extending through the second member, wherein coupling of the first member with the second member aligns axes of the first member and the second member such that the first aperture and the second aperture are aligned providing line-of-sight between a camera of the mobile computing device with the lens of the spotting scope or binoculars, the line-of-sight extending through the first member and the second member of the attachment system.

14. The attachment system of claim 13, wherein the locking mechanism comprises protrusions extending from an end of the locking mechanism, wherein the protrusions engage a portion of the recesses in the groove of the coupling member of the first member of the attachment device when the locking mechanism engages the groove.

15. The attachment system of claim 13, wherein the first ring shaped base comprises a recess in each of the first channels.

16. The attachment system of claim 15, further comprising a magnet coupled within each recess in each of the first channels.

17. The attachment system of claim 16, wherein the second member is magnetically attractive.

18. The attachment system of claim 17, wherein coupling of the first member with the second member comprises extending the first plurality of protrusions within the second channels and the second plurality of protrusions within the first channels, wherein the magnets coupled to the first member are magnetically coupled to the second plurality of protrusion of the second member.

19. A method of using an attachment system for coupling a mobile
computing device to a spotting scope or binoculars, the method comprising:
coupling a first member of an attachment system to a mobile computing device in a location adjacent a camera of the mobile computing device;
coupling a second member of the attachment system adjacent a lens to an eyepiece of the
spotting scope or binoculars
releasably and magnetically coupling the first member to the second member; and
in response to coupling the first member to the second member, providing a line-of-sight and between the camera of the mobile computing device with the lens of the spotting scope or binoculars, the line-of-sight extending through the first member and the member of the attachment system wherein: the first member comprises: a first ring shaped base; a first plurality of protrusions extending from a rear side of the ring shaped base and extending parallel to an axis of the first ring shaped base, the plurality of protrusions equally spaced apart along the circumference of the ring shaped base forming radial first channels between the first plurality of protrusions; a front side of the first ring shaped base configured to couple to the mobile computing device; and a first aperture extending through the first member; and the second member comprises: a second ring shaped base; a second plurality of protrusions extending from a front side of the second ring shaped base and extending parallel to an axis of the second ring shaped base, the plurality of protrusions equally spaced apart along the circumference of the second ring shaped base forming radial second channels between the second plurality of protrusions; a rear side of the second ring shaped base configured to couple adjacent a lens of the spotting scope or binoculars; and a second aperture extending through the second member, wherein coupling of the first member with the second member aligns axes of the first member and the second member such that the first aperture and the second aperture are aligned providing the line-of-sight between the camera of the mobile computing device with the lens of the spotting scope or binoculars.

* * * * *

UNITED STATES PATENT AND TRADEMARK OFFICE
CERTIFICATE OF CORRECTION

PATENT NO. : 11,624,969 B2
APPLICATION NO. : 17/573149
DATED : April 11, 2023
INVENTOR(S) : Kevin W. Gibbens, David W. Gibbens and Eric Christensen It is certified that error appears in the above-identified patent and that said Letters Patent is hereby corrected as shown below:

In the Claims

Column 10, Line 52 (Claim 19):
Delete the words "adjacent a lens".

Signed and Sealed this
Sixteenth Day of May, 2023

Katherine Kelly Vidal
*Director of the United States Patent and Trademark Office*